US008418984B2

(12) United States Patent
Hartelius et al.

(10) Patent No.: US 8,418,984 B2
(45) Date of Patent: Apr. 16, 2013

(54) SLIDER CLIP AND PHOTOVOLTAIC STRUCTURE MOUNTING SYSTEM

(75) Inventors: John Hartelius, Brick, NJ (US); Michael Monaco, Stanhope, NJ (US); Kyle Kazimir, South Plainfield, NJ (US); John Anthony Bellacicco, Stamford, CT (US)

(73) Assignee: First Solar, Inc.

( * ) Notice: Subject to any disclaimer, the term of this patent is extended or adjusted under 35 U.S.C. 154(b) by 10 days.

(21) Appl. No.: 12/959,213

(22) Filed: Dec. 2, 2010

(65) Prior Publication Data

US 2011/0073733 A1    Mar. 31, 2011

Related U.S. Application Data

(63) Continuation of application No. 12/846,365, filed on Jul. 29, 2010.

(51) Int. Cl.
    *A47B 97/00*        (2006.01)
(52) U.S. Cl.
    USPC ............ 248/500; 248/237; 52/489.1; 52/712; 211/41.1
(58) Field of Classification Search .................. 248/500, 248/200, 237, 220.21, 223.41; 211/41.1; 29/428; 136/251; 52/489.1, 712, 463, 459
    See application file for complete search history.

(56) References Cited

U.S. PATENT DOCUMENTS

| | | | | |
|---|---|---|---|---|
| 4,452,027 A | * | 6/1984 | Desai | ............................... 52/712 |
| 5,076,035 A | * | 12/1991 | Wright | ............................. 52/464 |
| 6,360,491 B1 | | 3/2002 | Ullman | |
| 6,617,507 B2 | | 9/2003 | Mapes et al. | |
| 6,959,517 B2 | | 11/2005 | Poddany et al. | |
| 7,307,209 B2 | | 12/2007 | Mapes et al. | |
| 2003/0094193 A1 | | 5/2003 | Mapes et al. | |
| 2006/0174931 A1 | | 8/2006 | Mapes et al. | |
| 2007/0084504 A1 | | 4/2007 | Kobayashi et al. | |
| 2008/0035140 A1 | | 2/2008 | Placer et al. | |
| 2008/0087320 A1 | | 4/2008 | Mapes et al. | |
| 2009/0114209 A1 | | 5/2009 | Moller et al. | |
| 2009/0282755 A1 | | 11/2009 | Abbot et al. | |
| 2010/0071755 A1 | | 3/2010 | Kruse | |
| 2010/0193012 A1 | | 8/2010 | Klammer et al. | |
| 2010/0236183 A1 | | 9/2010 | Cusson et al. | |
| 2010/0237028 A1 | * | 9/2010 | Cusson | ......................... 211/41.1 |
| 2010/0237029 A1 | | 9/2010 | Cusson et al. | |

FOREIGN PATENT DOCUMENTS

| | | |
|---|---|---|
| AU | 2002301823 B2 | 3/2003 |
| AU | 2007202073 A1 | 12/2007 |
| AU | 2008200493 A1 | 2/2008 |
| AU | 2007216819 A1 | 4/2008 |
| AU | 2008202966 A1 | 7/2008 |
| AU | 2009200626 A1 | 9/2009 |
| AU | 2009101302 A2 | 2/2010 |
| AU | 2009245849 A1 | 6/2010 |
| AU | 2010200545 A1 | 9/2010 |
| AU | 2010101337 A4 | 1/2011 |
| AU | 2010202731 A1 | 1/2011 |
| AU | 2011100128 A4 | 3/2011 |
| CN | 2013 7 3608 Y | 12/2009 |
| CN | 201374339 Y | 12/2009 |
| CN | 1952320 B | 6/2010 |
| CN | 101877363 A | 11/2010 |
| DE | 20 2004 019 681 U1 | 3/2005 |
| DE | 20 2007 008 659 U1 | 8/2007 |
| DE | 20 2008 009 241 U1 | 11/2009 |
| DE | 20 20 10 005 003 U1 | 8/2010 |
| DE | 10 2009 019 548 A1 | 11/2010 |
| EP | 1 734 588 A2 | 12/2006 |
| EP | 1 734 588 A3 | 9/2007 |
| EP | 1 947 402 A1 | 7/2008 |
| EP | 2 290 303 A2 | 3/2011 |
| WO | WO 03/007688 A2 | 1/2003 |
| WO | WO 2004/095589 A2 | 11/2004 |
| WO | WO 2005/116359 A2 | 12/2005 |
| WO | WO 2006/010261 A1 | 2/2006 |
| WO | WO 2006/072230 A1 | 7/2006 |
| WO | WO 2006/082399 A1 | 8/2006 |
| WO | WO 2007/045695 A1 | 4/2007 |
| WO | WO 2007/069437 A1 | 6/2007 |
| WO | WO 2007/096157 A2 | 8/2007 |
| WO | WO 2008/021714 A2 | 2/2008 |
| WO | WO 2008/102789 A1 | 8/2008 |
| WO | WO 2008/124158 A1 | 10/2008 |
| WO | WO 2008/134893 A1 | 11/2008 |

(Continued)

OTHER PUBLICATIONS

"SunClip"; Sunclip Solor Solutions; http://www.sunclip.de/english/index.html; 2007-2010 by Sunclip GmbH, pp. 1.

*Primary Examiner* — Amy J. Sterling

(74) *Attorney, Agent, or Firm* — Dickstein Shapiro LLP

(57) ABSTRACT

Described herein is a mounting system and slider clips that support simplified installation of photovoltaic structures. The mounting system comprises a support structure which can be mounted to support columns via an optional tilt table. The support structure comprises a plurality of parallel spaced beams and a plurality of parallel spaced rails that are mounted approximately perpendicular to the beams. Disclosed embodiments describe a collapsible support structure in which the rails are pivotally mounted to the beams. Rails are preassembled with prefabricated slider clips for holding edge portions of the photovoltaic structures. Rails can also be integrally formed with slider clips. Described herein are also methods of installing one or more photovoltaic structures using the mounting system and methods for manufacturing slider clips and a photovoltaic structure mounting system.

7 Claims, 19 Drawing Sheets

FOREIGN PATENT DOCUMENTS

| | | |
|---|---|---|
| WO | WO 2008/145903 A1 | 12/2008 |
| WO | WO 2008/152748 A1 | 12/2008 |
| WO | WO 2008/157201 A2 | 12/2008 |
| WO | WO 2009/033547 A1 | 3/2009 |
| WO | WO 2009/038810 A1 | 3/2009 |
| WO | WO 2009/087902 A1 | 7/2009 |
| WO | WO 2009/091238 A1 | 7/2009 |
| WO | WO 2009/095273 A1 | 8/2009 |
| WO | WO 2009/137887 A1 | 11/2009 |
| WO | WO 2009/150525 A2 | 12/2009 |
| WO | WO 2009/154165 A1 | 12/2009 |
| WO | WO 2009/158715 A2 | 12/2009 |
| WO | WO 2009/158717 A2 | 12/2009 |
| WO | WO 2010/003594 A2 | 1/2010 |
| WO | WO 2010/007256 A2 | 1/2010 |
| WO | WO 2010/012920 A1 | 2/2010 |
| WO | WO 2010/019742 A2 | 2/2010 |
| WO | WO 2010/019745 A2 | 2/2010 |
| WO | WO 2010/019754 A2 | 2/2010 |
| WO | WO 2010/024154 A1 | 3/2010 |
| WO | WO 2010/025903 A2 | 3/2010 |
| WO | WO 2010/034856 A1 | 4/2010 |
| WO | WO 2010/040780 A1 | 4/2010 |
| WO | WO 2010/045514 A2 | 4/2010 |
| WO | WO 2010/051998 A2 | 5/2010 |
| WO | WO 2010/054274 A2 | 5/2010 |
| WO | WO 2010/054496 A2 | 5/2010 |
| WO | WO 2010/054617 A2 | 5/2010 |
| WO | WO 2010/060391 A1 | 6/2010 |
| WO | WO 2010/063018 A2 | 6/2010 |
| WO | WO 2010/063815 A2 | 6/2010 |
| WO | WO 2010/065614 A1 | 6/2010 |
| WO | WO 2010/071085 A1 | 6/2010 |
| WO | WO 2010/082355 A1 | 7/2010 |
| WO | WO 2010/082653 A1 | 7/2010 |
| WO | WO 2010/083819 A2 | 7/2010 |
| WO | WO 2010/085939 A2 | 8/2010 |
| WO | WO 2010/089469 A1 | 8/2010 |
| WO | WO 2010/100375 A1 | 9/2010 |
| WO | WO 2010/100376 A1 | 9/2010 |
| WO | WO 2010/107419 A1 | 9/2010 |
| WO | WO 2010/107466 A1 | 9/2010 |
| WO | WO 2010/108288 A2 | 9/2010 |
| WO | WO 2010/111383 A2 | 9/2010 |
| WO | WO 2010/119579 A1 | 10/2010 |
| WO | WO 2010/124529 A1 | 11/2010 |
| WO | WO 2010/125699 A1 | 11/2010 |
| WO | WO 2010/131386 A1 | 11/2010 |
| WO | WO 2010/140878 A2 | 12/2010 |
| WO | WO 2010/141740 A2 | 12/2010 |
| WO | WO 2011/004943 A1 | 1/2011 |
| WO | WO 2011/007201 A1 | 1/2011 |
| WO | WO 2011/013391 A1 | 2/2011 |
| WO | WO 2011/015186 A2 | 2/2011 |
| WO | WO 2011/019460 A2 | 2/2011 |
| WO | WO 2011/022125 A2 | 2/2011 |
| WO | WO 2011/025585 A2 | 3/2011 |
| WO | WO 2011/026334 A1 | 3/2011 |

* cited by examiner

SECTION A-A

SECTION B-B

US 8,418,984 B2

SLIDER CLIP AND PHOTOVOLTAIC STRUCTURE MOUNTING SYSTEM

CROSS-REFERENCE TO RELATED APPLICATIONS

This application is a continuation of U.S. patent application Ser. No. 12/846,365, filed on Jul. 29, 2010, the subject matter of which is incorporated in its entirety by reference herein.

FIELD OF THE INVENTION

Embodiments of the invention relate to the field of photovoltaic (PV) power generation systems, and more particularly to a system and method for simplifying installation of PV structures at an installation site.

BACKGROUND OF THE INVENTION

Photovoltaic power generation systems are currently constructed by installing a foundation system (typically a series of posts), a module structural support frame (typically brackets, tables or rails, and clips), and then mounting PV modules, also known as solar panels, to the support frame. The PV modules are then grouped electrically together into PV strings, which are fed to an electric harness. The harness conveys electric power generated by the PV modules to an aggregation point and onward to electrical inverters.

Conventional methods and systems of mounting a PV module to a rail or other structural support frame typically uses four module edge clips with rubber inserts that must be screwed into the rail in the field in parallel with installing the module on the rail. These methods and systems require screwing the clip halfway down, setting the upper and lower PV modules associated with the clip in place, and final tightening of the clip screw to secure the module to the rail. This process of handling the clips, halfway setting the clip, setting the PV modules and finally tightening the clips is slow and labor intensive.

With innovations in PV cell efficiency quickly making PV-generated energy more cost-effective, demand for large-scale PV system installations is growing. Such systems may have a row length of half a mile or more of installed PV modules. Accordingly, a simplified and cost effective system for PV module installation is needed.

DETAILED DESCRIPTION OF THE INVENTION

In the following detailed description, reference is made to the accompanying drawings which form a part hereof, and in which is shown by way of illustration specific embodiments that may be practiced. These embodiments are described in sufficient detail to enable those skilled in the art to make and use them, and it is to be understood that structural, logical or procedural changes may be made to the specific embodiments disclosed.

Described herein is a mounting system and slider clips that support simplified installation of photovoltaic (PV) structures. The mounting system comprises a support structure which can be mounted to support columns via an optional tilt table. The support structure comprises a plurality of parallel spaced beams and a plurality of parallel spaced rails that are mounted perpendicular to the beams. Disclosed embodiments describe a collapsible support structure in which the rails are pivotally mounted to the beams. Rails are preassembled with slider clips for holding edge portions of the photovoltaic structures and allowing for easy slide in insertion of the photovoltaic structures into the slider clips. Rails can also be integrally formed with slider clips. The mounting system maximizes the use of prefabricated and preassembled components and reduces the on-site field labor costs associated with installing the PV structures. Described herein are also methods of installing one or more photovoltaic structures using the mounting system and methods for manufacturing slider clips and a photovoltaic structure mounting system.

Figure 1:
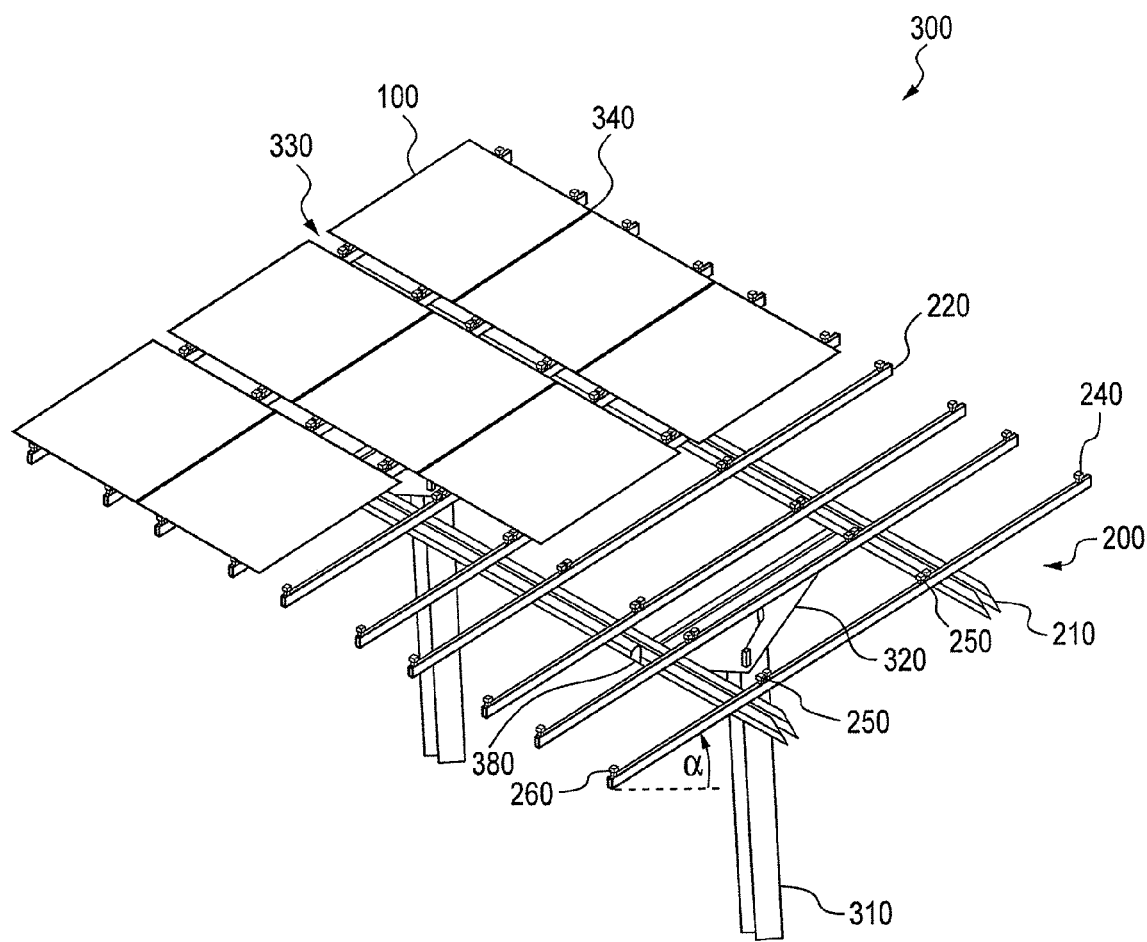
FIG. 1 is a perspective view of a mounting system with installed PV modules in accordance with a disclosed embodiment.

FIG. 1 is a perspective view of a mounting system 300 with installed PV modules 100 in accordance with an example embodiment described herein. System 300 has a plurality of PV modules 100 mounted on a support structure 200. A prefabricated frameless PV module 100 is typically comprised of a top layer, a bottom layer, an array of PV cells positioned tightly between the top and bottom layers and ancillary elements such as a PV generator junction box. The PV cell can be a solar cell made of thin-film, silicon or any other material for capturing solar radiation and converting the solar radiation into direct current (DC). The front and back sheets are typically made of glass or other transparent material to provide structural support and protect the PV cells from environmental hazards. Since each PV cell captures only a small amount of solar energy, multiple PV cells are electrically connected together to form a PV module 100. A plurality of PV modules 100 can be grouped together and installed on-site to achieve a desired voltage and current. Although the embodiment described herein applies to a PV module 100 with dimensions of approximately 48 in×24 in, it will be readily appreciated by those skilled in the art that the disclosed embodiments may be modified to support PV modules with other dimensions such as, for example, 24 in×12 in and 48 in×48 in. Also, although the PV module 100 is described as frameless, the various embodiments described herein can be adapted for framed PV modules as well.

Figure 2A:
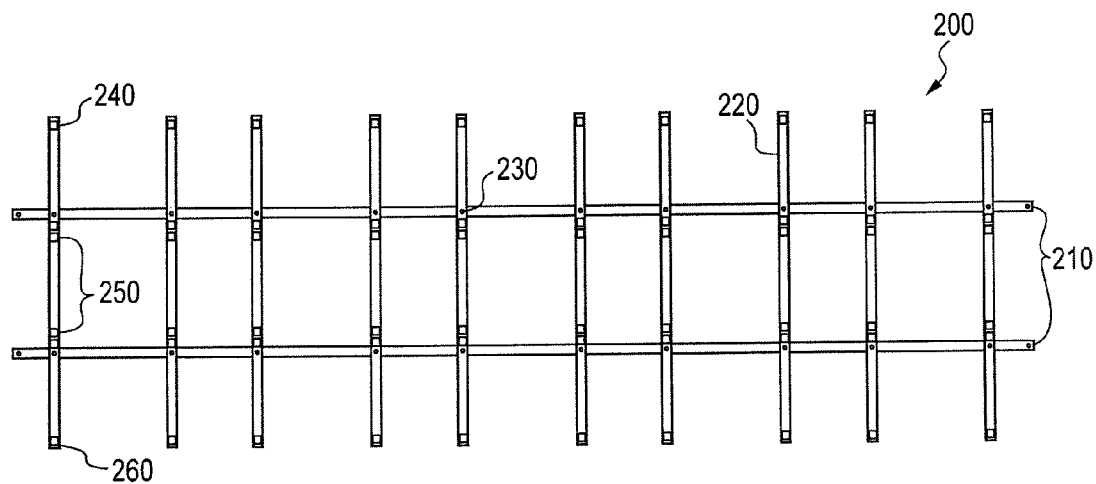
FIGS. 2A-2B illustrate a PV module support structure in accordance with a disclosed embodiment.

FIG. 2A is a top view of the PV module support structure 200. In this example embodiment, rails 220 and beams 210 are approximately 6.5 feet and 20 feet in length, respectively. Rails 220 are mounted on beams 210 at alternating distances of approximately 27.50 inches and 20.50 inches apart. It should be appreciated that while FIG. 2A illustrates a support structure 200 having ten rails 220 mounted on two beams 210, the embodiments are not so limited in the number of rails and beams. It should also be appreciated that rails 220 and beams 210 can be manufactured for any length depending on the array size and size of the PV modules to be mounted.

Figure 2B:
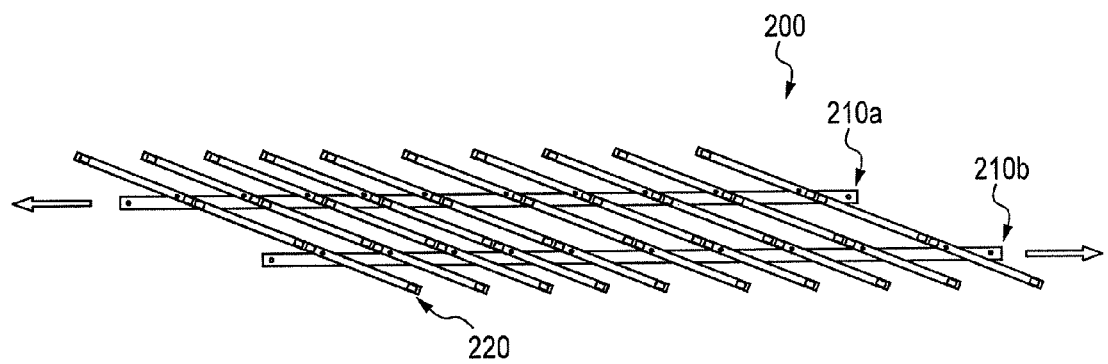

Support structure 200 includes a plurality of parallel spaced rails 220 pivotally connected to one or more parallel spaced beams 210 by fasteners 230, such as a rivet or any other suitable connector which allows rail rotation, at each point of intersection. FIG. 2A is a top view of support structure 200 arranged in an installation configuration whereby the rails 220 are approximately perpendicular to beams 210. Support structure 200 can collapse at the pivot points into a folded configuration in the manner shown in FIG. 2B. Support structure 200 can be collapsed by moving beams 210a and 210b relative to one another in opposite directions, as shown in FIG. 2B, such that beams 210a and 210b eventually move to be adjacent to each other and the rails 220 become substantially oblique to the beams 210. The beams 210 in the FIG. 2A configuration are approximately parallel to each other and spaced further apart than the beams 210 in the folded configuration in the manner shown in FIG. 2B.

A fully collapsed support structure 200 has significantly less volume than a support structure 200 in the installation configuration and is easier to transport to an installation site. Once support structure 200 is transported to the installation site, it can be expanded from the folded configuration shown in FIG. 2B to the configuration shown in FIG. 2A and then be mounted on tilt tables 320. PV modules 100 can be mounted to rails 220 when support structure 200 is in the installation configuration of FIG. 2A. It should be understood that rails 220 can alternatively be rigidly fastened to the beams 210 by fasteners 230 in the FIG. 2A configuration if a collapsible support structure is not desired or needed.

Figure 3A:
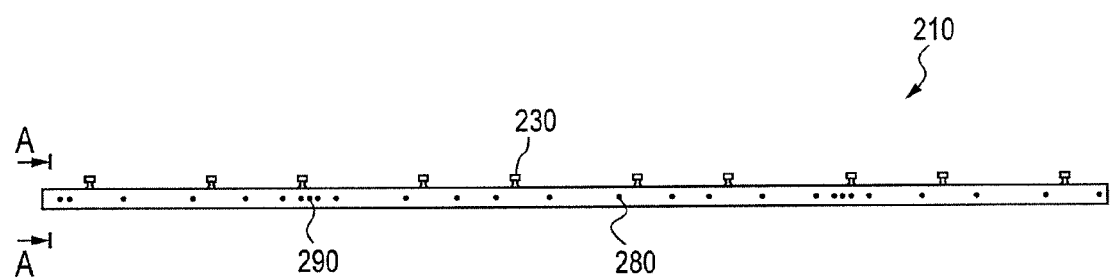
FIGS. 3A-B illustrate a beam of a PV module support structure in accordance with a disclosed embodiment.
Figure 3B:
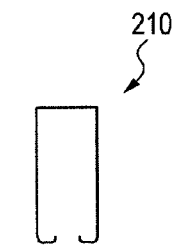

System 300 is constructed by installing the support structure 200 comprising a plurality of parallel spaced beams 210 and a plurality of parallel spaced rails 220 mounted approximately perpendicular to the beams 210. FIG. 3A is a side view of beam 210 in accordance with a disclosed embodiment. Beam 210 has pre-punched holes 290 on the side for PV wire management. Preferably, three 0.375-24 roll thread or ⅜-24 rivnut holes 290 are pre-punched in beam 210. A set of three holes 290 can be pre-punched at pre-determined intervals on beam 210. During on-site installation, wires attached to PV module 100 can be mounted through the holes 290. In addition, holes 280 are pre-punched on the side of the beam 210 for attachment of the beam 210 to a tilt table 320 (FIGS. 1 and 3E) to achieve a tilt angle α. FIG. 3B shows a cross-sectional view of beam 210 without the fasteners 230. Beam 210 has a top-hat shaped cross-section formed of two J-shaped side walls extending downward perpendicularly from the top surface of beam 210.

Figure 3C:
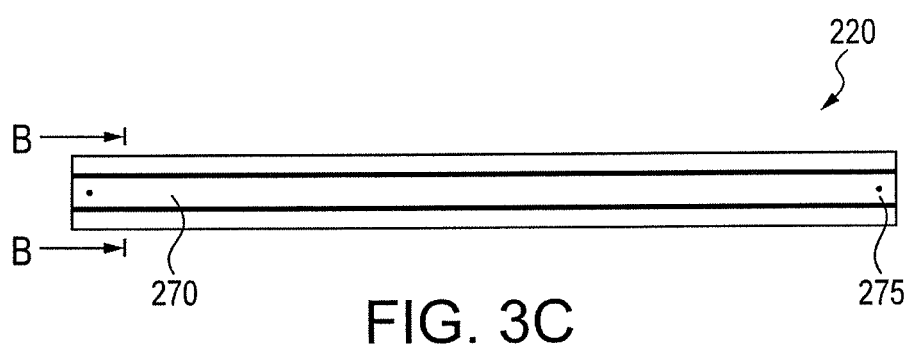
FIGS. 3C-D illustrate a rail of a PV module support structure in accordance with a disclosed embodiment.
Figure 3D:
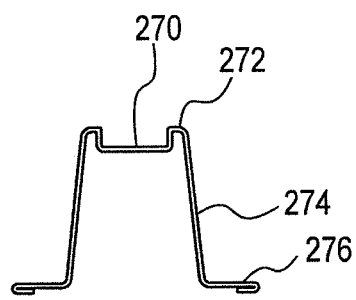

Referring to FIG. 3C, rail 220 has a recessed top surface 270 extending the length of the rail 220. Rail 220 also includes an opening or hole 275 in which a fastener, such as a bolt, screw, nut, rivet or other means of attachment can pass through to attach rail 220 to beam 210. FIG. 3D shows a cross-sectional view of a rail 220 having a top mounting structure 272, side plates 274 extending downward perpendicularly from the sides of the top mounting structure 272 and base plates 276 extending outward perpendicularly from the bottom of side plates 274.

Figure 3E:
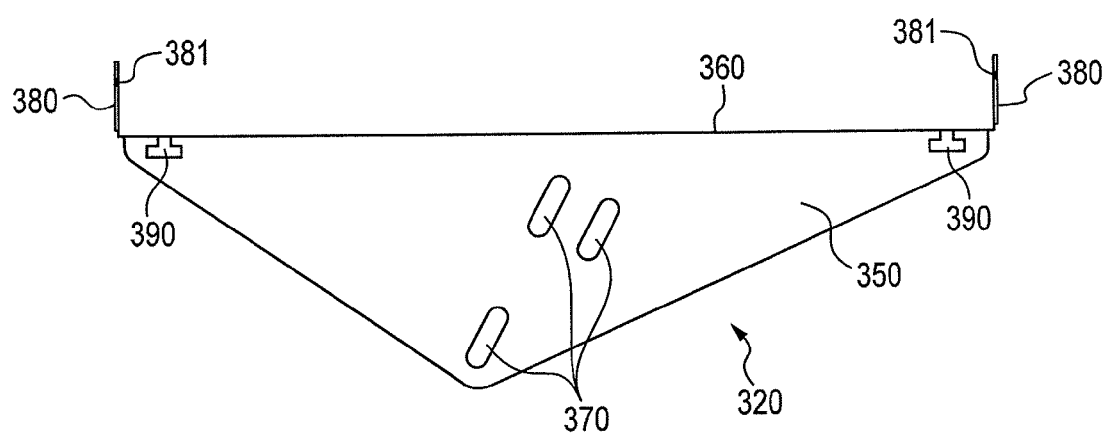
FIG. 3E is a side view of a tilt table of a mounting system in accordance with a disclosed embodiment.

Beams 210 in turn may be attached to and supported by tilt tables 320, which may be tilted at an angle α for achieving maximum total energy output for a given installation. The tilt tables 320 are mounted to support columns 310 as shown in FIG. 1. FIG. 3E is a side view of a tilt table 320. Tilt table 320 includes a lower supporting portion 350 and an upper mounting portion 360 which can be tilted at installation. Lower supporting portion 350 has one or more openings or holes 370 configured for a fastener, such as a bolt, screw, nut, rivet or other means of attachment to pass through to attach to a support column 310 (FIG. 1). Tilt table 320 can be adjusted to a predetermined angle relative to the ground or any other support surface by tightening the fastener passing through hole 370 at the predetermined angle. Tilt table 320 also has an opening or hole 390 at a corner of lower supporting portion 350 in which a fastener, such as a bolt, screw, nut, rivet or other means of attachment can pass through to attach tilt table 320 to beams 210. Tilt table 320 can optionally have a connector 380 extending upward, perpendicularly from an end of upper mounting portion 360. Connector 380 has an opening or hole 381 configured for a fastener, such as a bolt, screw, nut, rivet or other means of attachment to pass through to secure the tilt table 320 to a beam 210 as shown in FIG. 1.

The support columns, tilt tables, beams and rails can be made of a metal material, such as, galvanized steel or aluminum, or any other suitable material. The support structure 200 can be prefabricated and preassembled off-site, thereby reducing on-site field labor costs and simplifying the installation process. Preferably, the support structure 200 is collapsible in the manner described above for easier transport to the installation site. The installation site preferably includes supporting columns 310 mounted into a support surface and tilt tables 320 attached to the support columns 310 as shown in FIG. 1. To install the support structure 200 when in the configuration shown in FIG. 2A, the beams 210 of support structure 200 are attached to the tilt tables 320 as described above. The support structure 200 can be mounted to other mounting surfaces such as building roofs or sides instead of to tilt tables 320.

Referring to FIG. 2A, rail 220 is prefabricated with slider clips 240, 250 and 260 for holding edge portions of PV modules 100. The distance between the centers of each pair of adjacent slider clips 240, 250 and 260 on a rail 220 is approximately 25.50 inches. The bottom surfaces of slider clips 240, 250 and 260 fit securely within the recessed area 270 (FIG. 3C) of rail 220. A top slider clip 240 is mounted at the top of rail 220 and a bottom slider clip 260 is mounted at the bottom of rail 220. Mounted between the top 240 and bottom 260 slider clips on rail 220 are one or more mid slider clips 250. The slider clips 240, 250 and 260 are prefabricated and pre-assembled on the support structure 200 off-site. Even though FIG. 2A shows that a mid slider clip 250 is mounted near every intersection of rail 220 and beam 210, it should be appreciated that a mid slider clip 250 can be mounted away from the intersection and multiple mid slider clips can be mounted on rail 220 between each pair of beams 210 depending on the dimensions and number of PV modules 100 to be installed along the rail 220.

PV modules 100 can be mounted on a rail 220 using two adjacent pairs of pre-installed top 240 and mid 250 slider clips, two adjacent pairs of mid 250 and bottom 260 slider clips, or two adjacent pairs of mid 250 slider clips. Alternatively, PV modules 100 can be mounted on a rail 220 having only top 240 and bottom 260 slider clips. As explained in greater detail below, PV module 100 is mounted on the rail 220 by first sliding an edge portion of one end of the module 100 into, for example, a top slider clip 240. Next, the PV module 100 is laid down on the rail 220. Finally, the opposite edge of the module 100 is slid into the slider clip adjacent to the top slider clip 240, which can be a mid slider clip 250 or a bottom slider clip 260. Once all of the PV modules 100 are mounted, small gaps 330 and 340 may exist between adjacent PV modules 100 as shown in FIG. 1.

Figure 4A:
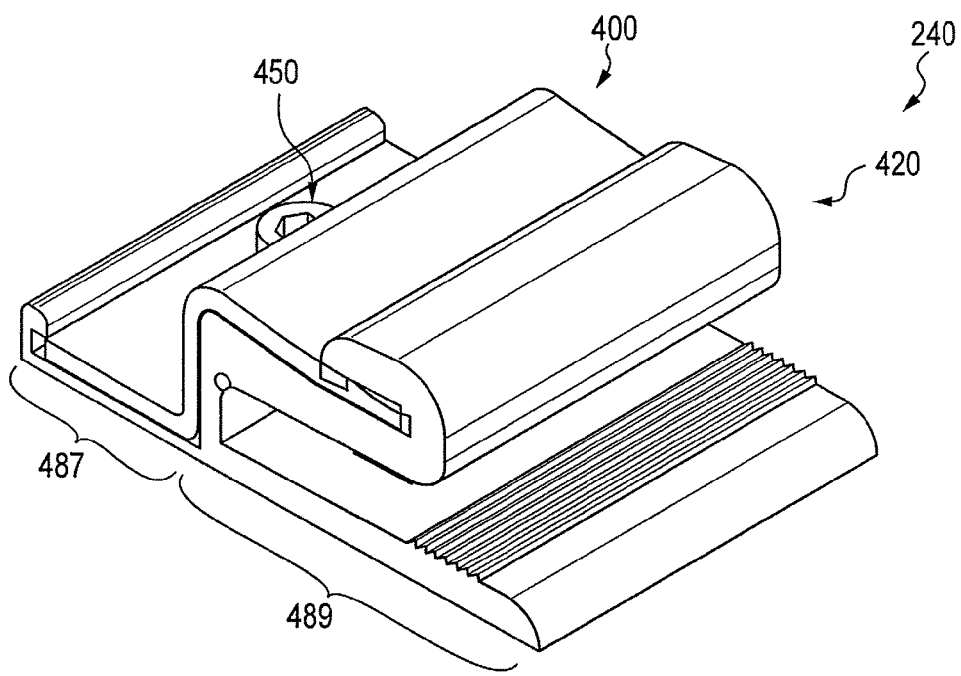
FIGS. 4A-4B illustrate, respectively, a perspective view and a side view of a top slider clip assembly in accordance with a disclosed embodiment.
Figure 4B:
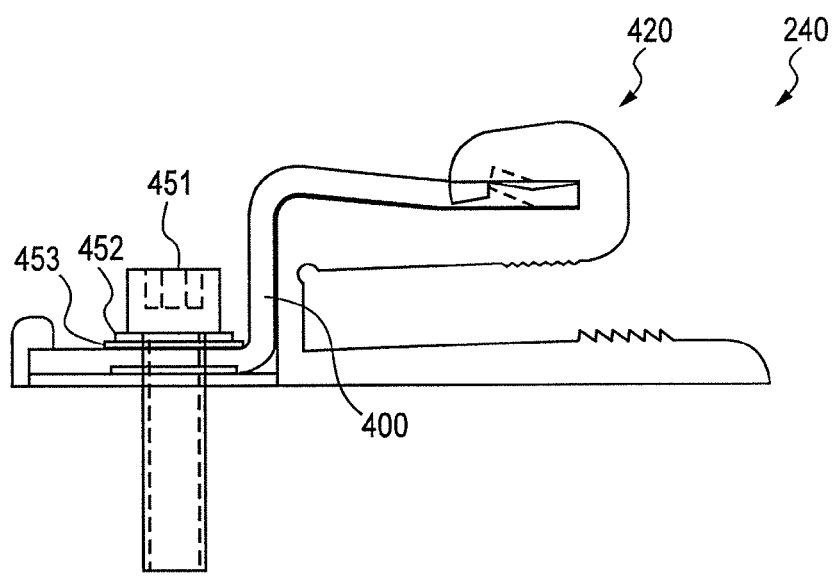

FIGS. 4A and 4B illustrate, respectively, a perspective view and a side view of a top slider clip assembly 240 in accordance with an embodiment described herein. Top slider clip assembly 240 has a PV module (solar panel) holding element 489 extending from one end of a support area 487. Top slider clip assembly 240 components include a S-shaped clip frame 400, a clip insert 420 and a fastening element 450 for attaching the top slider clip assembly 240 to a rail 220. Clip frame 400 is preferably made of stainless steel or other corrosion resistant metals or hard materials. Clip insert 420 serves as an insulating material for a PV module 100 and operates to hold an edge portion of PV module 100 in place on a rail 220. Fastening element 450 attaches the clip assembly 240 to rail 220.

Figure 5A:
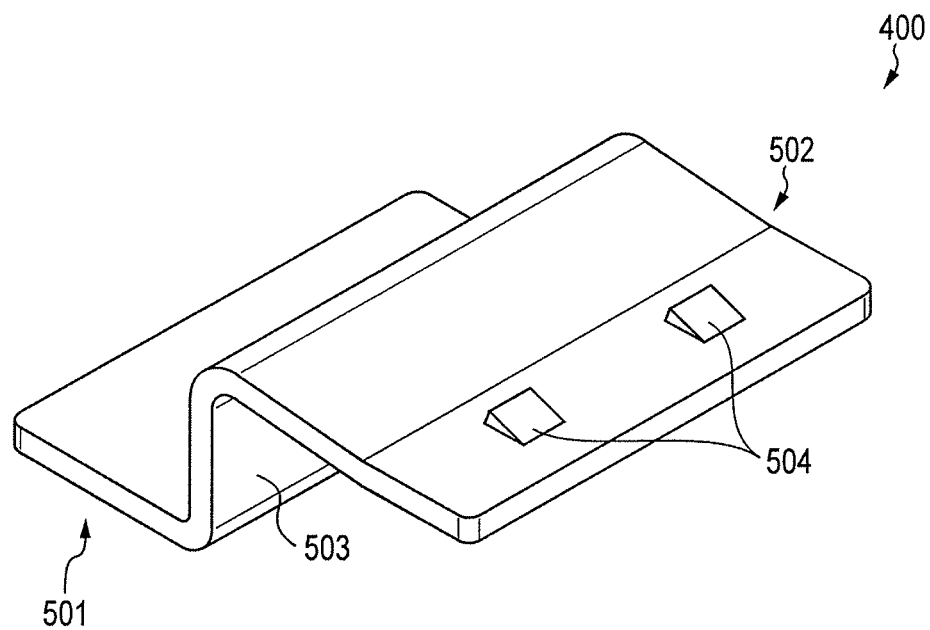
FIGS. 5A-5B illustrate, respectively, a perspective view and a side view of a top slider clip frame in accordance with a disclosed embodiment.
Figure 5B:
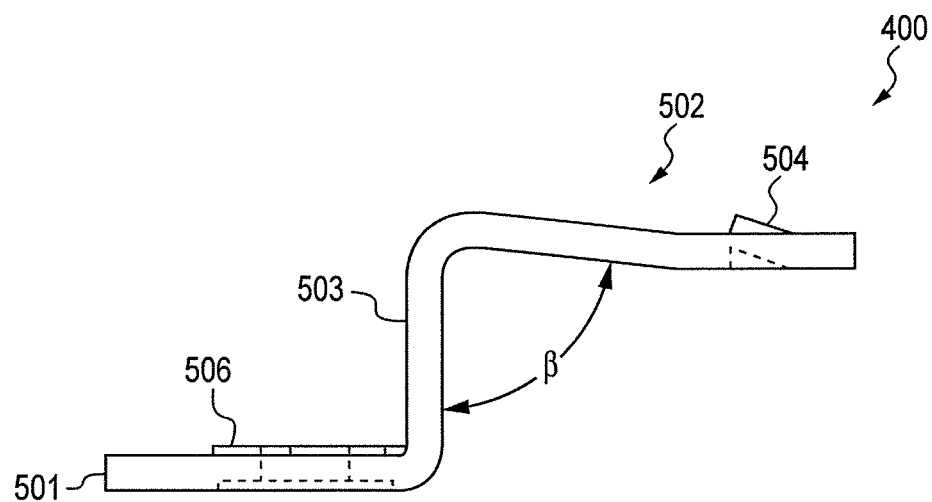

Top slider clip frame 400 is illustrated in more detail in FIGS. 5A and 5B. FIG. 5A illustrates a perspective view of clip frame 400 and FIG. 5B illustrates a side view of clip frame 400. Clip frame 400 is formed as an integral structure. The integral structure of clip frame 400 has a flat bottom extension 501 with an opening or hole in which a fastener 450, such as a bolt, screw, nut, rivet or other means of attachment can pass through to attach assembly 240 to rail 220. In this example embodiment, fastener 450 is a 0.25-20 socket head cap bolt 451. Other elements such as a washer 452 and a gasket 453 may also be included in the fastening element 450. The bolt 451 is preferably torqued to a minimum of 100 in-lbs during pre-fabrication of the support structure 200. Unlike the conventional systems of mounting a PV module, the tightening of the slider clips can be performed prior to arriving at the installation site, thus, simplifying the on-site installation, especially of large-scale PV systems installations.

As shown in FIG. 5B, an emboss layer 506 may cover at least a portion of the top surface of bottom extension 501. A vertical sidewall 503 of the S-shaped clip frame 400 connects the bottom extension 501 and a top extension 502. Top extension 502 extends from sidewall 503 in the opposite direction from the bottom extension 501. Protruding from the top surface of top extension 502 are at least two angled structures such as, for example, tiger teeth 504, for holding the clip insert 420 in place with the clip frame 400. In this example embodiment, the bottom extension 501 is approximately one inch long and two inches wide and the top extension 502 is approximately 1.25 inches long and two inches wide. The vertical sidewall 503 is preferably about 0.85 inch tall. The top extension 502 and sidewall 503 forms an angle β equal to or less than 90 degrees, preferably 84.1 degrees. The angle of the tiger teeth 504 in conjunction with the angle β of the top extension 502 operate to hold the clip insert 420 in place with the clip frame 400.

Figure 6A:
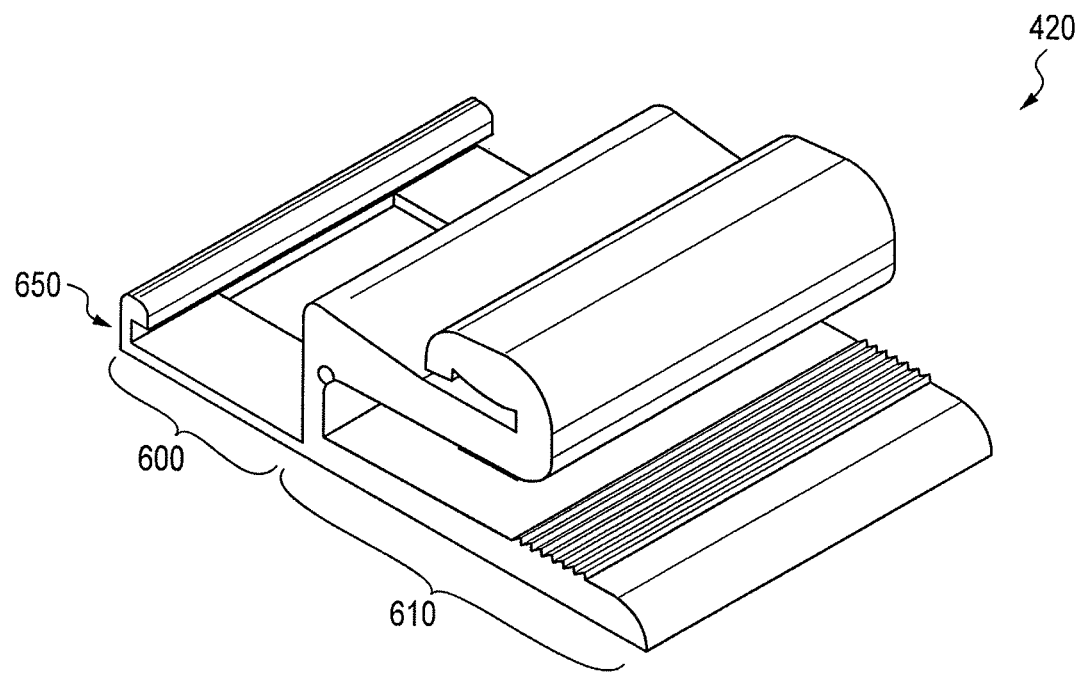
FIGS. 6A-6B illustrate, respectively, a perspective view and a side view of a top slider clip insert in accordance with a disclosed embodiment.
Figure 6B:
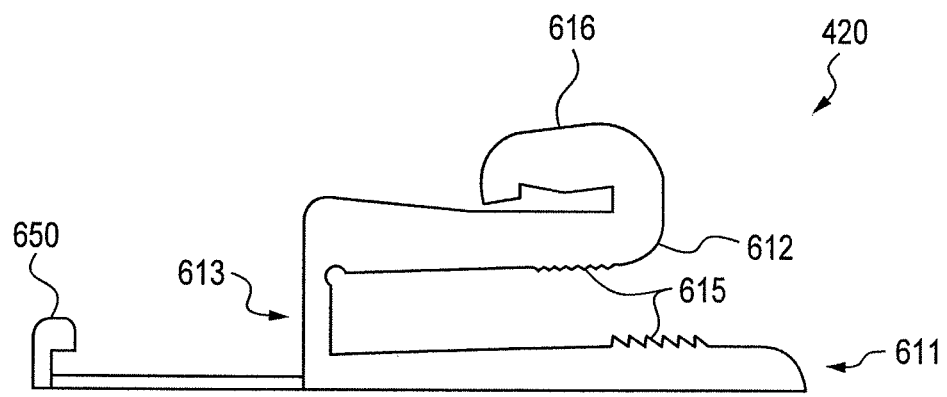

FIGS. 6A and 6B illustrate, respectively, a perspective view and a side view of the top slider clip insert 420. Clip insert 420 has a flat middle section 600 that sits directly under the bottom extension 501 of clip frame 400. Extending from one end of the middle section 600 is a C-shaped holding element 610 for holding an edge portion of PV module 100. At the other end of the middle section 600 is a curved tail section 650. Clip insert 420 is preferably made of fire resistant silicone rubber, for example, Ethylene Propylene Diene Monomer (EPDM) rubber. It should be appreciated that other types of rubber and insulating material may be used provided that the hardness of the material used preferably has a shore A durometer of between 50 and 70.

The C-shaped holding element 610 has a substantially flat bottom section 611, a top section 612 and a vertical barrier 613 connecting the bottom section 611 and the top section 612 to form a channel for holding an edge portion of PV module 100. The vertical barrier 613 is preferably 0.73 inch tall. The bottom surface of top section 612 and the top surface of bottom section 611 are preferably surfaces which resist PV module movement. In this example embodiment, the surfaces are at least partially covered with angled teeth 615, which preferably run the width of sections 611 and 612. The teeth 615 are angled towards the barrier 613 such that the counter-acting teeth operate to hold the PV module 100 in place between sections 611 and 612. Moreover, as explained above, since the PV module 100 will be installed at a tilt angle, its weight and the friction caused by the EPDM rubber also help to frictionally retain the PV module 100 in place.

As shown in FIGS. 4A and 4B, clip insert 420 is integrally connected to clip frame 400. In this example embodiment, the C-shaped holding element 610 (FIG. 6A) of clip insert 420 fits snuggly within the area formed by the top extension 502 and the sidewall 503 (FIG. 5B) of clip frame 400. Referring to FIG. 6B, the top section 612 of clip insert 420 includes a curved element such as, for example, a hook element 616, that is designed to engage with the tiger teeth 504 on the top extension 502 of the clip frame 400. Adhesives and other fastening means can be optionally added to secure the clip insert 420 to the clip frame 400.

Figure 7A:
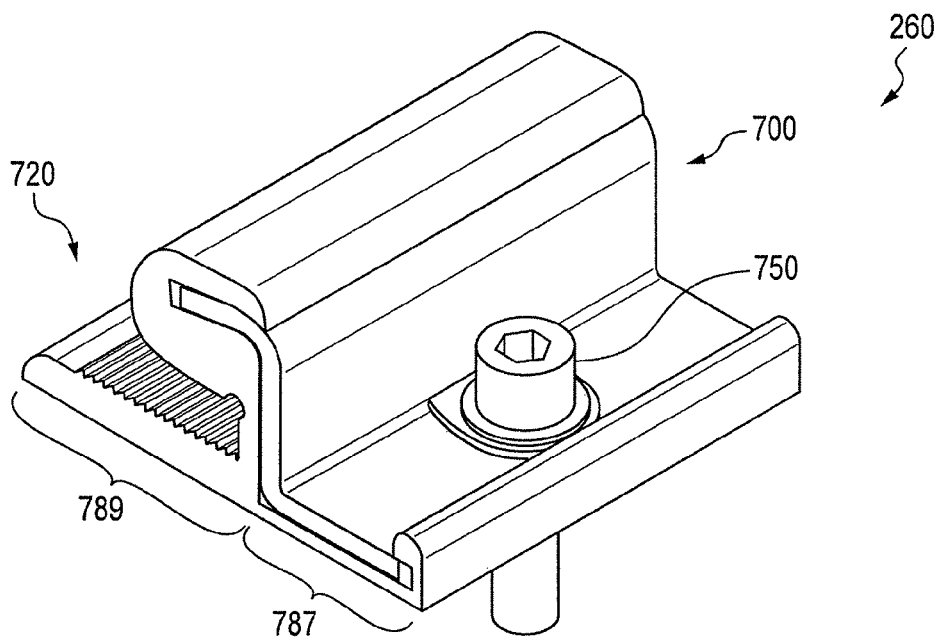
FIGS. 7A-7B illustrate, respectively, a perspective view and a side view of a bottom slider clip assembly in accordance with a disclosed embodiment.
Figure 7B:
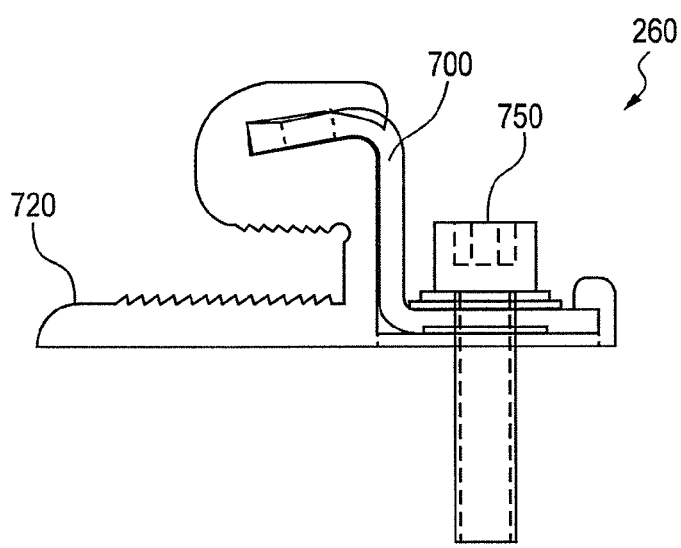

FIGS. 7A and 7B illustrate, respectively, a perspective view and a side view of a bottom slider clip assembly 260 in accordance with an embodiment described herein. Bottom slider clip assembly 260 shares similar features to top slider clip assembly 240. Clip assembly 260 has a PV module (solar panel) holding element 789 extending from one end of a support area 787. Clip assembly 260 components include a S-shaped clip frame 700, a clip insert 720 and fastening element 750 for attaching the bottom slider clip assembly 260 to a rail 220. Some clip assembly 260 components that are identical to clip assembly 240 components such as, for example, fastening element 750 are not described below. The differences between clip assemblies 260 and 240 are explained in more detail below.

Figure 8A:
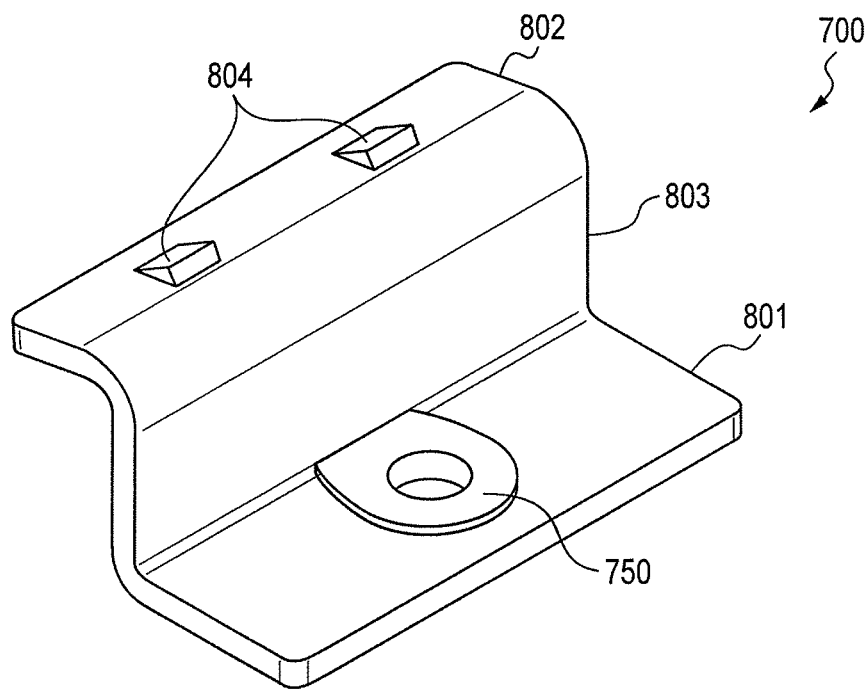
FIGS. 8A-8B illustrate, respectively, a perspective view and a side view of a bottom slider clip frame in accordance with a disclosed embodiment.
Figure 8B:
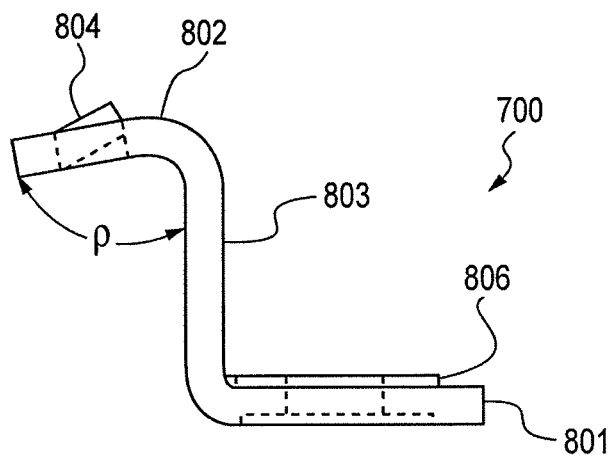

Bottom slider clip frame 700 is illustrated in more detail in FIGS. 8A and 8B. FIG. 8A illustrates a perspective view of clip frame 700 and FIG. 8B illustrates a side view of clip frame 700. Clip frame 700 is preferably made of the same material as clip frame 400. Clip frame 700 is formed as an integral structure. Similar to clip frame 400, the integral structure of clip frame 700 has a flat bottom extension 801 that extends from one end of sidewall 803. The bottom extension 801 has an opening or hole in which a fastener, such as a bolt, screw, nut, rivet or other means of attachment can pass through to attach assembly 260 to rail 220. The top 802 and bottom 801 extensions of the bottom slider clip frame 700 are preferably shorter than the top 502 and bottom 501 extensions of the top slider clip frame 400. In this embodiment, the bottom extension 801 is approximately 0.81 inch long and two inches wide and the top extension 802 is approximately 0.48 inch long and two inches wide. Emboss layer 806 optionally covers at least a portion of the top surface of bottom extension 801 as shown in FIG. 8B. The top extension 802 and sidewall 803 forms an angle ρ equal to or less than 90 degrees, preferably 80.0 degrees. Protruding tiger teeth 804 located on the top surface of top extension 802 serves the same function as tiger teeth 504 of clip frame 400.

Figure 9A:
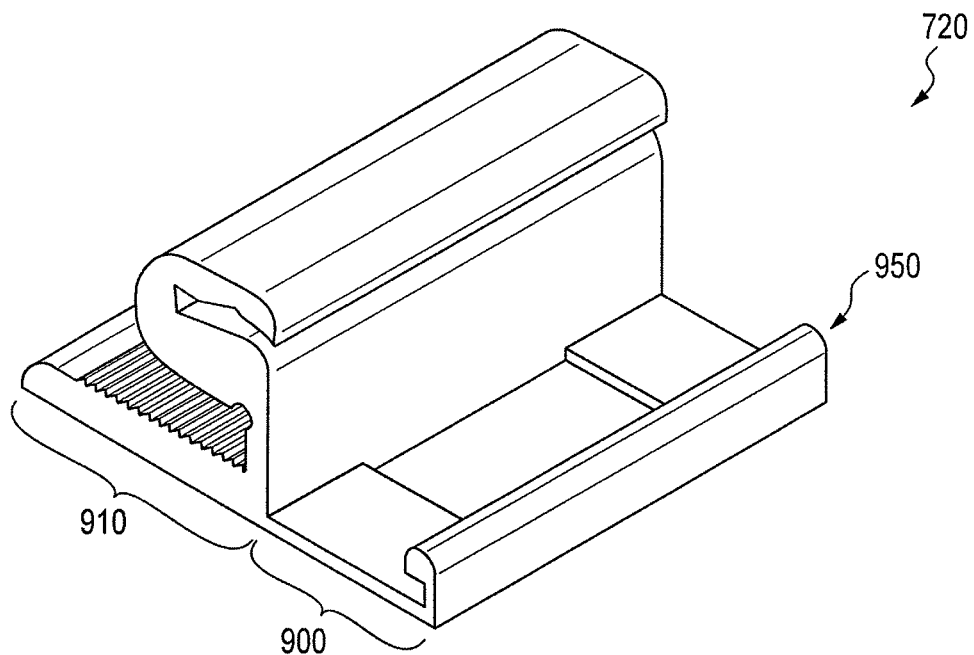
FIGS. 9A-9B illustrate, respectively, a perspective view and a side view of a bottom slider clip insert in accordance with a disclosed embodiment.
Figure 9B:
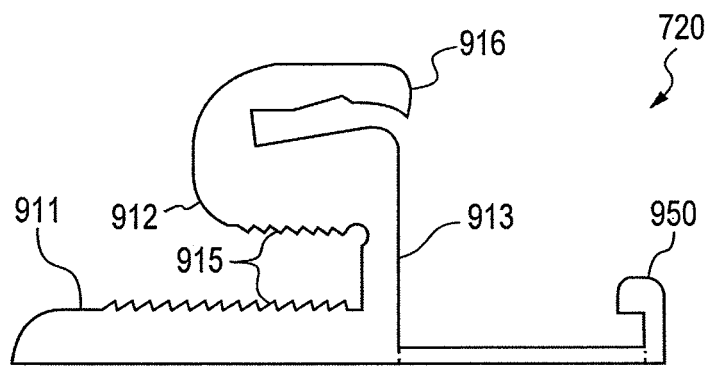

FIGS. 9A and 9B illustrate, respectively, a perspective view and a side view of the bottom slider clip insert 720. Clip insert 720 is preferably made of the same material as clip insert 420. Similar to clip insert 420, clip insert 720 has a flat middle section 900 that sits directly under the bottom extension 801 of clip frame 700. Extending from one end of the middle section 900 is a C-shaped holding element 910 for holding an edge portion of PV module 100. At the other end of the middle section 900 is a curved tail section 950.

The C-shaped holding element 910 has a substantially flat bottom section 911, a top section 912 and a vertical barrier 913 connecting the bottom section 911 with the top section 912 to form a channel for frictionally holding an edge portion of PV module 100. The vertical barrier 913 is preferably 0.73 inch tall. The bottom section 911 is preferably shorter than the bottom section 611. The bottom surface of top section 912 and the top surface of bottom section 911 are preferably resistant to PV module movement. The surfaces, for example, may be partially covered with angled teeth 915. The teeth 915 preferably run the width and length of sections 911 and 912 and are angled towards the barrier 913 such that the counteracting teeth operate to hold an edge portion of PV module 100 in place between sections 911 and 912.

As shown in FIG. 7A, clip insert 720 is integrally connected to clip frame 700. In this example embodiment, the C-shaped holding element 910 of clip insert 720 fits snuggly within the area formed by the top extension 802 and the sidewall 803 of clip frame 700. The top section 912 of clip insert 720 includes a curved element such as, for example, a hook element 916 that is designed to engage with the tiger teeth 804 on the top extension 802 of the clip frame 700.

Figure 10A:
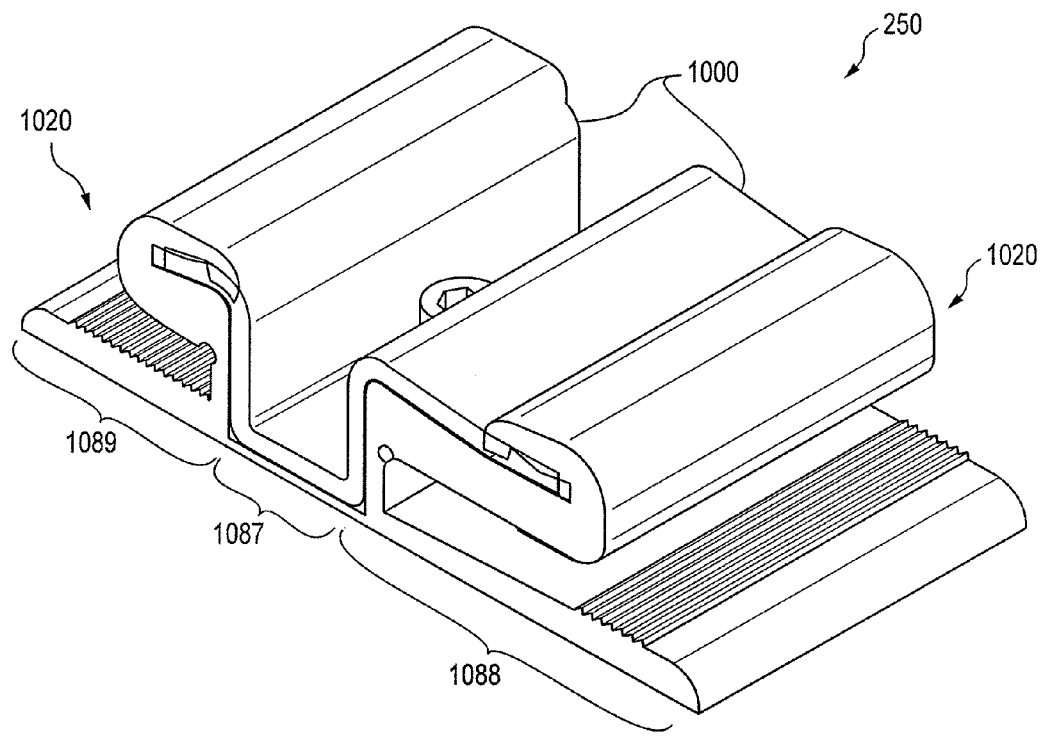
FIGS. 10A-10B illustrate, respectively, a perspective view and a side view of a mid slider clip assembly in accordance with a disclosed embodiment.
Figure 10B:
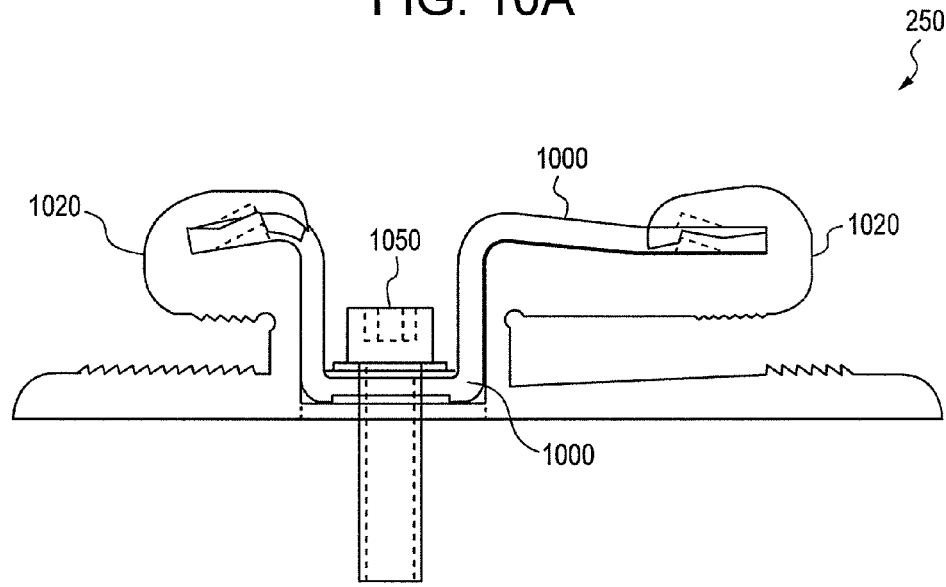

Having described example embodiments of the top slider clip assembly 240 and the bottom slider clip assembly 260, an example embodiment of the mid slider clip assembly 250 is now described. FIGS. 10A and 10B illustrate, respectively, a perspective view and a side view of an example embodiment of mid slider clip assembly 250. Mid slider clip assembly 250 has two PV module holding elements 1088 and 1089, each extending from opposite ends of a common support area 1087 for frictionally holding an edge portion of a PV module 100. Holding element 1088 is similar to holding element 489 of clip assembly 240. Holding element 1089 is similar to holding element 789 of clip assembly 260. Mid slider clip assembly 250 components include a clip frame 1000, a clip insert 1020 and fastening element 1050 for attaching the mid slider clip assembly 250 to rail 220. Fastening element 1050 is similar to fastening elements 450 and 750. The differences and similarities between assemblies 240, 260 and 250 are explained in more detail below.

Figure 11A:
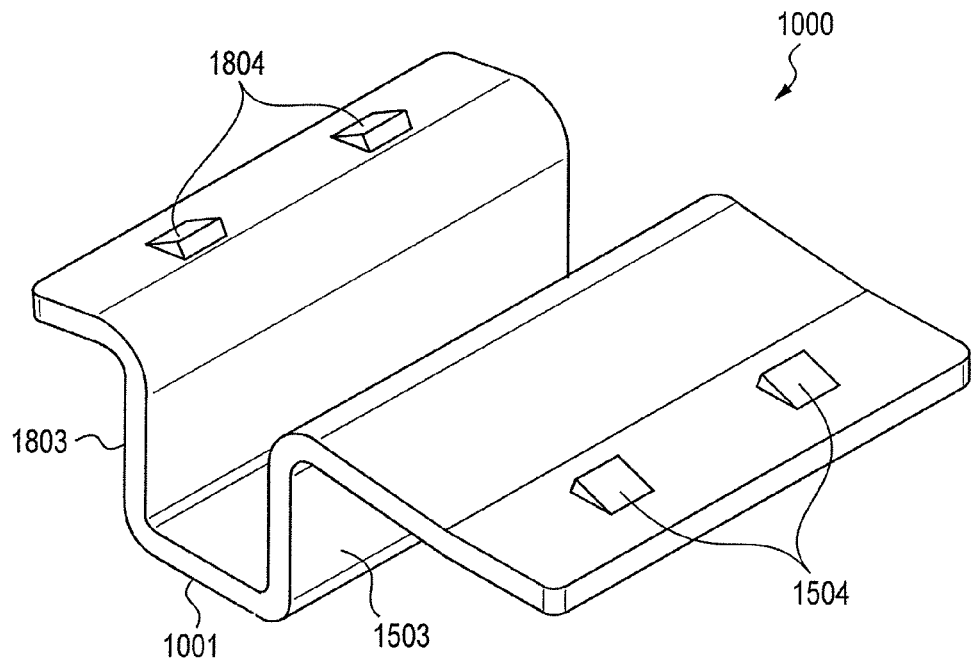
FIGS. 11A-11B illustrate, respectively, a perspective view and a side view of a mid slider clip frame in accordance with a disclosed embodiment.
Figure 11B:
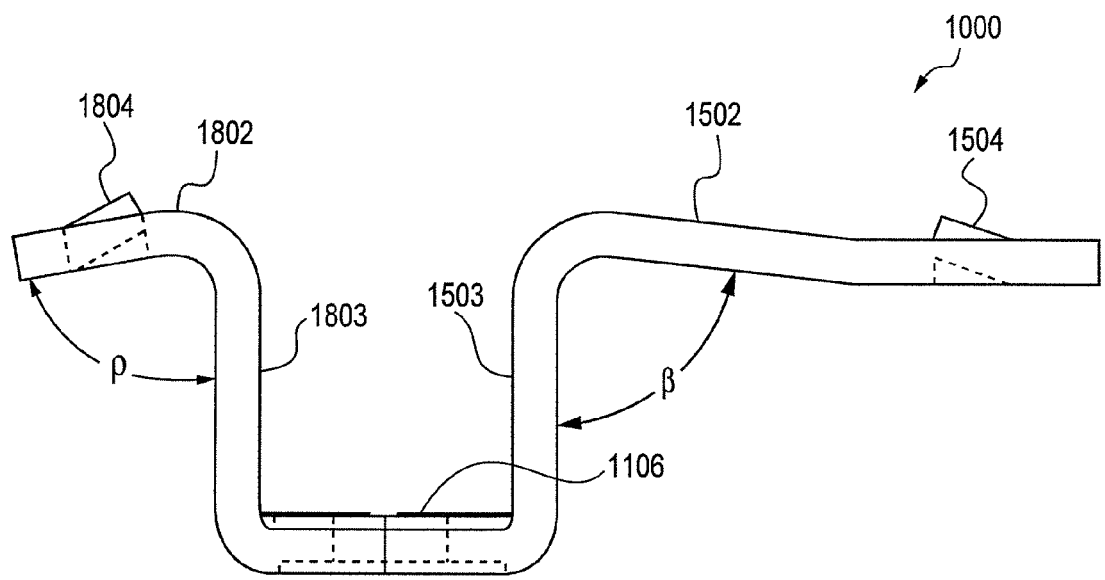

FIGS. 11A and 11B illustrate, respectively, a perspective view and a side view of the mid slider clip frame 1000. Clip frame 1000 is formed as an integral structure. The integral structure of clip frame 1000 is essentially the combination of the top slider clip frame 400 and the bottom slider clip frame 700 having a common bottom extension 1001. Similar to clip frames 400 and 700, the common bottom extension 1001 has an opening or hole in which a fastener, such as a bolt, screw, nut, rivet or other means of attachment can pass through to attach assembly 250 to rail 220. Emboss layer 1106 covers at least a portion of the top surface of the common bottom extension 1001. In this example embodiment, the common bottom extension 1001 has identical dimensions to the bottom extension 801 of clip frame 700. However, it should be understood that the common bottom extension 1001 can also have the same dimensions as the bottom extension 501 of clip frame 400. It should be appreciated that the width of the common bottom extension 1001 is preferably the same as extensions 801 and 501, but the length of the common bottom extension 1001 can be any arbitrary length.

Extending perpendicularly from one end of the common bottom extension 1001 is sidewall 1503 and from the other end is sidewall 1803. The vertical sidewalls 1503 and 1803 are preferably about 0.85 inch tall. Sidewall 1503 has a top extension 1502 that extends perpendicularly from the top of sidewall 1503 and away from the common bottom extension 1001. Similarly, sidewall 1803 has a top extension 1802 that extends perpendicularly from the top of sidewall 1803 and away from the common bottom extension 1001. The top extension 1802 is preferably shorter than the top extension 1502. The common bottom extension 1001, the sidewall 1503 and the top extension 1502 together form a S-shaped clip frame similar to the S-shaped top slider clip frame 400. Likewise, the common bottom extension 1001, the sidewall 1803 and the top extension 1802 together form a S-shaped clip frame similar to the S-shaped bottom slider clip frame 700. The top surfaces of top extensions 1502 and 1802 include respectively protruding angled structures such as, for example, tiger teeth 1504 and 1804. Clip frame 1000 is preferably made of the same material as clip frames 400 and 700.

As shown in FIG. 11B, the top extension 1502 and sidewall 1503 form an angle β equal to or less than 90 degrees, preferably 84.1 degrees. Likewise, the top extension 1802 and sidewall 1803 form an angle ρ equal to or less than 90 degrees, preferably 80.0 degrees. The difference in angle β from angle ρ results in the height from the common bottom extension 1001 to the outer tip of the top extension 1502 to be relatively equal to the height from the common bottom extension 1001 to the outer tip of the top extension 1802. In this example embodiment, this height is roughly 0.69 inches.

Figure 12A:
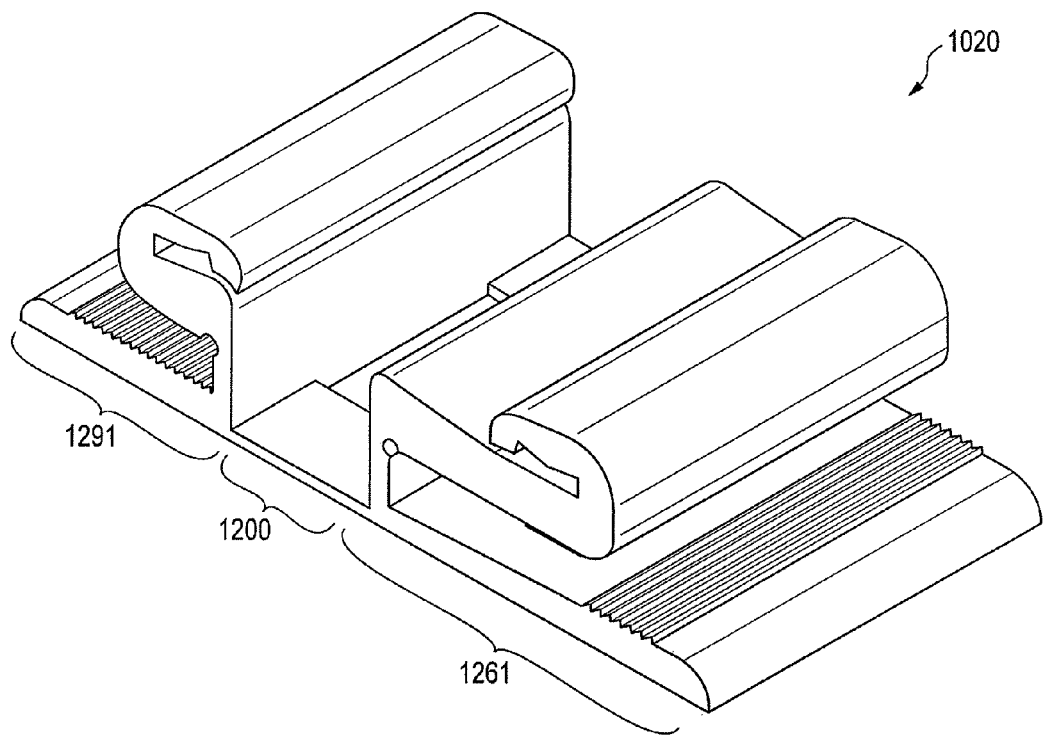
FIGS. 12A-12B illustrate, respectively, a perspective view and a side view of a mid slider clip insert in accordance with a disclosed embodiment.
Figure 12B:
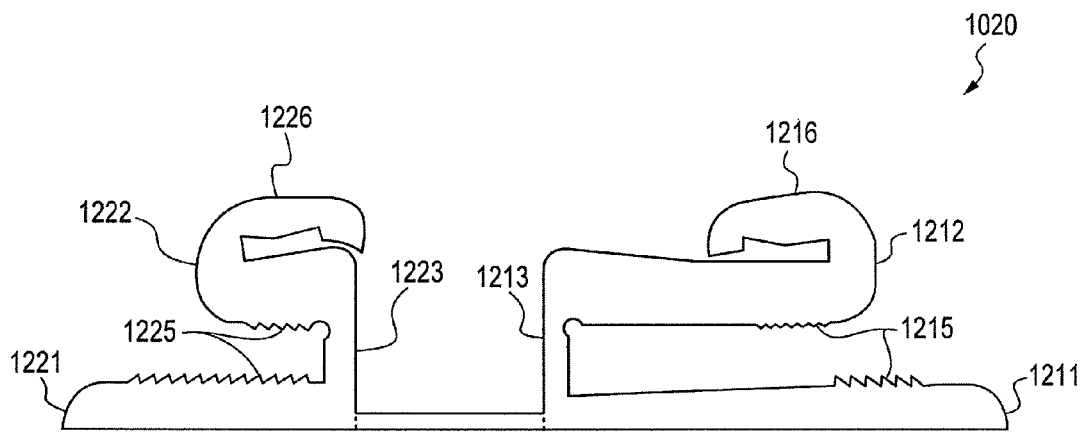

FIGS. 12A and 12B illustrate, respectively, a perspective view and a side view of the mid slider clip insert 1020. Clip insert 1020 is preferably made of the same material as clip inserts 420 and 720. Similar to the clip inserts 420 and 720, clip insert 1020 has a flat middle section 1200 that sits directly under the common bottom extension 1001 of clip frame 1000. However, unlike the other clip inserts 420 and 720, the mid slider clip insert 1020 does not have a tail section. Rather, extending from one end of the middle section 1200 is a C-shaped holding element 1261 and from the other end of the middle section 1200 is a C-shaped holding element 1291. Clip insert 1020 is designed to frictionally hold the edges of two PV modules 100—one in each of the C-shaped holding elements 1261 and 1291.

Similar to the C-shaped holding element 610 of the top slider clip insert 420, the C-shaped holding element 1261 has a substantially flat bottom section 1211, a top section 1212 and a vertical barrier 1213 connecting the bottom section 1211 with the top section 1212 to form a channel for frictionally holding an edge portion of a PV module 100. The bottom surface of top section 1212 and the top surface of bottom section 1211 are resistant to PV module movement. In this example embodiment, the surfaces are at least partially covered with angled teeth 1215. The teeth 1215 preferably run the width of sections 1211 and 1212 and are angled towards the barrier 1213 such that the counteracting teeth operate to hold an edge portion of PV module 100 in place between sections 1211 and 1212. The C-shaped holding element 1291 is like the C-shaped holding element 910 of the bottom slider clip insert 720. C-shaped holding element 1291 has a substantially flat bottom section 1221, a top section 1222 and a vertical barrier 1223 connecting the bottom section 1221 with the top section 1222 to form a channel for frictionally holding an edge portion of PV module 100. The bottom surface of top section 1222 and the top surface of bottom section 1221 are surfaces which resist PV module movement. In this example embodiment, the surfaces are at least partially covered with angled teeth 1225. The teeth 1225 preferably run the width and length of sections 1221 and 1222 and are angled towards the barrier 1223 such that the counteracting teeth operate to hold an edge portion of PV module 100 in place between sections 1221 and 1222. The bottom section 1221 is shorter than the bottom section 1211 similar to the difference in length between the bottom sections 611 and 911. Moreover, the top section 1222 is shorter than the top section 1212. Thus, the C-shaped holding element 1291 will be referred to as the short end of the mid slider clip assembly 250 while the C-shaped holding element 1261 will be referred to as the long end of the mid slider clip assembly 250. Clip assembly 240 has only a long end (i.e., holding element 610) while clip assembly 260 has only a short end (i.e., holding element 910).

As shown in FIG. 10A, clip insert 1020 is integrally connected to clip frame 1000. In this example embodiment, the common bottom extension 1001 of clip frame 1000 is attached to the top surface of middle section 1200 and the C-shaped holding elements 1261 and 1291 fit snuggly within the respective area formed by the top extension 1502 and sidewall 1503 and the top extension 1802 and sidewall 1803. Similar to the designs of the top sections 612 and 912, the top sections 1212 and 1222 include respective curved elements such as, for example, hook elements 1216 and 1226, for engaging with respective tiger teeth 1504 and 1804.

The mid slider clip assembly 250 is mounted on rail 220 such that its short end faces the PV module holding element 489 of the top slider clip assembly 240. The long end of mid slider clip assembly 250 then faces the PV module holding element 789 of the bottom slider clip assembly 260. Alternatively, it should be understood that the mid slider clip assembly 250 can be mounted on rail 220 in the opposite direction such that its long end faces towards the top of rail 220 and its short end faces the bottom of rail 220. However, in this alternative embodiment, the location of the slider clip assemblies 240 and 260 would have to be swapped such that the clip assembly 240 is now mounted on the bottom end of rail 220 and the clip assembly 260 is now mounted on the top end of rail 220. The significance of the mounting direction for clip assemblies 240, 250 and 260 will be explained in connection with FIG. 13 below.

Figure 13:
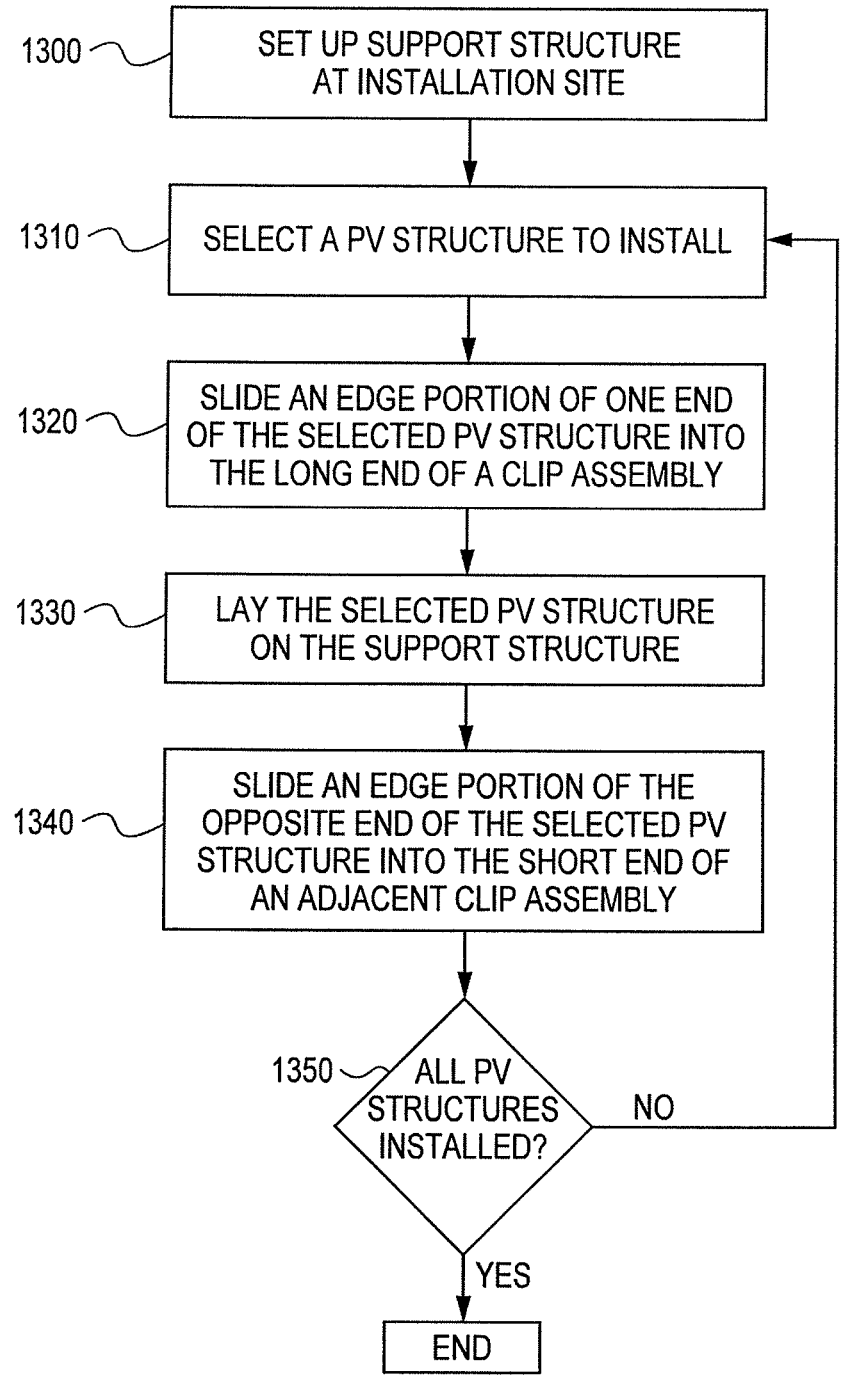
FIG. 13 illustrates a method for installing a plurality of PV structures in accordance with an embodiment described herein.
Figure 14A:
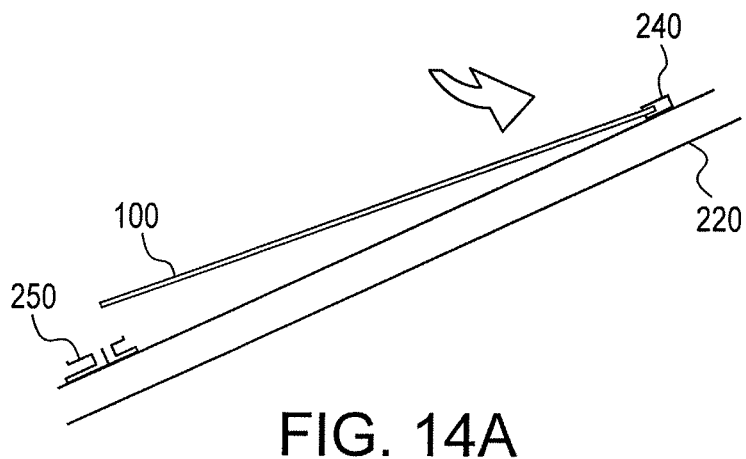
FIGS. 14A-14C illustrate in process flow a method for installing a PV structure in accordance with an embodiment described herein.
Figure 14B:
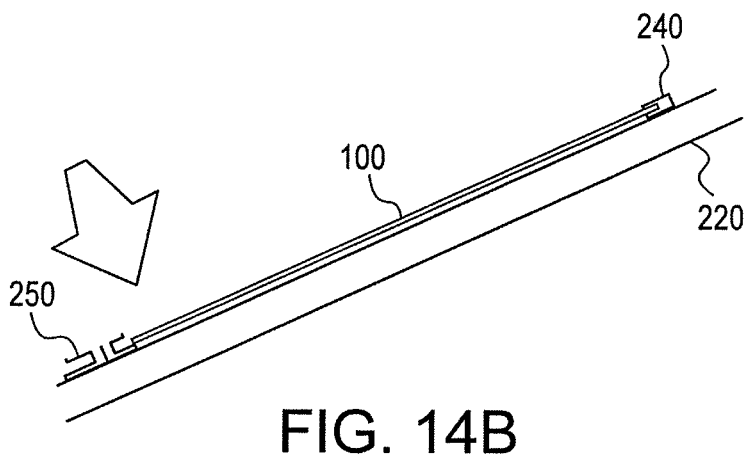
Figure 14C:
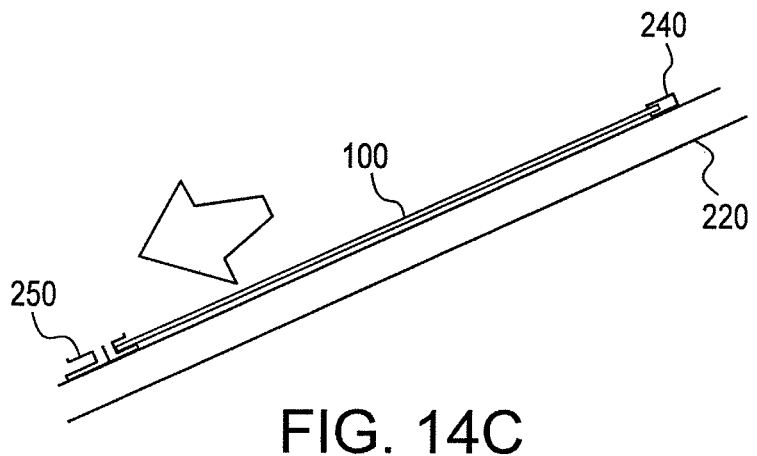

FIG. 13 illustrates a method for installing a plurality of PV structures on the prefabricated support structure 200 described above. FIGS. 14A-14C illustrate in process flow a method for installing a single PV structure on the support structure using top and mid slider clip assemblies in accordance with an embodiment described herein. Although the steps below are described with respect to the PV module 100, it should be understood that the process applies to any kind of PV structure including the framed PV structure described below in connection with FIG. 16.

At step 1300, the prefabricated support structure 200 having preassembled slider clips is setup at an installation site. Once the support structure is setup, the PV modules 100 are mounted on the module rails 220 using slider clips 240, 250 and 260. A PV module 100 is selected for installing on the support structure 200 at step 1310. At step 1320 and illustrated in FIG. 14A, one end of the selected PV module 100 is slid into the long end of a clip assembly, such as, for example, C-shaped holding element 610 of the top slider clip assembly 240. The PV module 100 has to be slid far enough in section 610 such that at step 1330, the PV module 100 can be laid flat on rail 220 as shown in FIG. 14B. At step 1340 and illustrated in FIG. 14C, the other end of the PV module 100 is then slid into the short end of an adjacent slider clip assembly, such as, for example, C-shaped holding element 1291 of mid slider clip assembly 250. The PV module 100 is thus frictionally held in place by the slider clips holding it. At step 1350, a determination is made as to whether all PV modules 100 have been installed. The process ends if all PV modules 100 have been mounted. Otherwise, the process returns to step 1310 for the selection of the next PV module to install on rail 220.

It should be understood that regardless of the pair of adjacent slider clips used for installing a PV module 100, an edge of the PV module 100 is slid into the slider clip with the longer clip frame and clip insert before the opposite edge of the PV module 100 is slid into the other slider clip with the shorter clip frame and clip insert. The lengths of the clip holding elements and the distance between the mounting locations of adjacent clip assemblies on a rail 220 are designed to simplify the installation process and to hold an edge portion of PV module 100.

Figure 15:
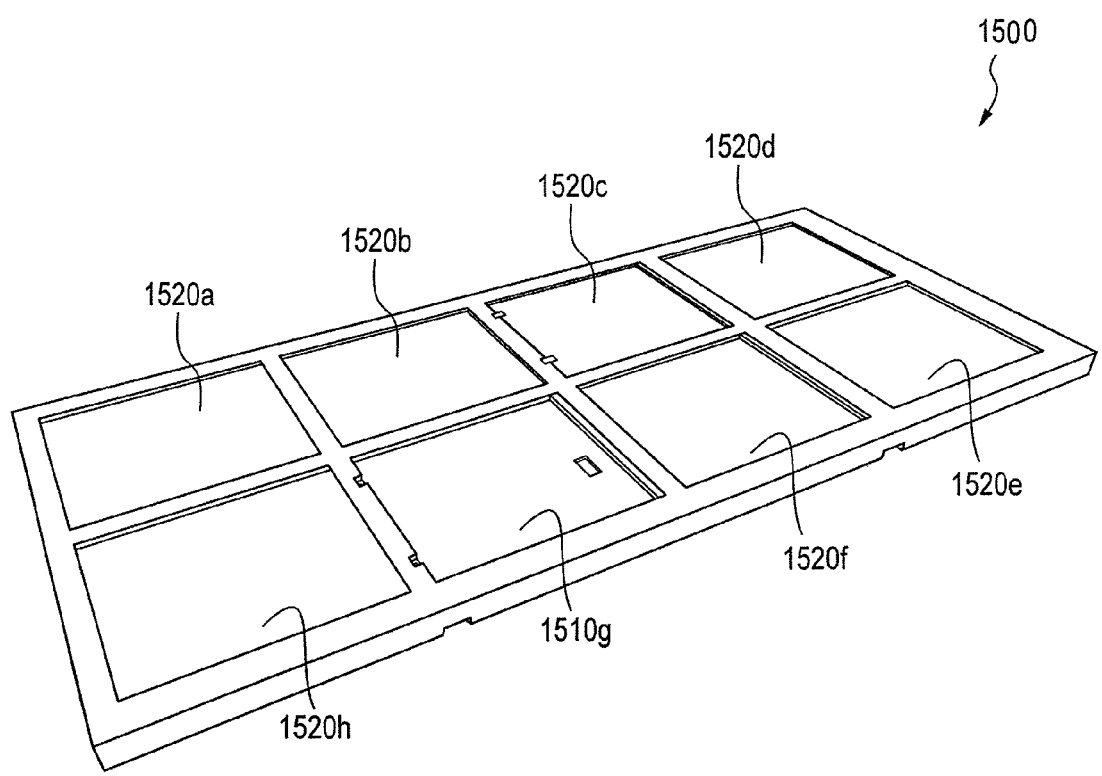
FIG. 15 is a perspective view of a plurality of PV modules supported by a common carrier structure in accordance with another disclosed embodiment.

FIG. 15 is a perspective view of a plurality of framed PV modules 100 supported by a common carrier structure 1500 in accordance with another disclosed embodiment. The carrier structure 1500 is a lightweight, cartridge-like PV module carrier structure that provides structural support, contains and supports an array of PV modules 1520*a-h* and enables their electrical connections. The carrier 1500 is approximately two inches thick and made of either synthetic or natural structural material, including, but not limited, to aluminum, rolled steel, or other metals and plastics. The PV modules 1520*a-h* (1520*g* is not shown) are each held in place by being snapped, clipped, or otherwise securely seated in a recessed area such as 1510*g*. The PV modules 1520*a-h* are preferably mounted in the carrier structure 1500 before transporting them to an installation site, so all that needs to be done at the installation site is to mount the carrier structure 1500 to a support structure. Although an array of eight PV modules 1520*a-h* is shown in FIG. 15, it is understood that any number or arrangement of solar panels could be mounted on and supported by a carrier structure 1500. A pre-wired common bus or cable system for transmitting harvested solar electricity may be integral to the carrier structure 1500.

Figure 16:
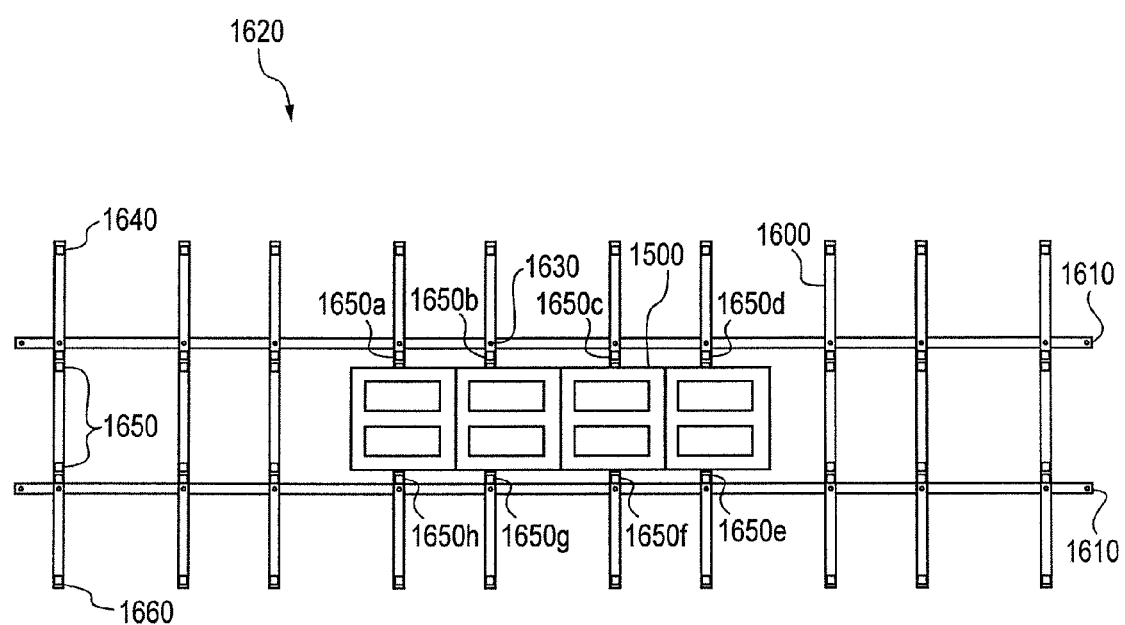
FIG. 16 is a top view of a support structure with an installed PV structure in accordance with another disclosed embodiment.

FIG. 16 is a perspective view of a support structure 1620 of a mounting system that can be used to install the carrier structure 1500. The mounting system can be constructed by installing the support structure 1620 comprising a plurality of parallel spaced beams 1610 mounted to support columns via tilt tables similar to those illustrated in FIGS. 1A and 1B. Like the mounting system 300 described above, parallel spaced rails 1600 are mounted perpendicularly to beams 1610 using fasteners 1630. Prefabricated slider clips 1640, 1650 and 1660 are preassembled on rails 1600. It should be understood that slider clips 1640, 1650 and 1660 have substantially the same overall design as slider clips 240, 250 and 260, respectively. Slider clips 1640, 1650 and 1660 each frictionally hold an edge portion of the carrier structure 1500, which contains an array of PV modules 100 rather than a single PV module 100. Since the carrier structure 1500 is typically thicker and heavier than a frameless PV module, slider clips 1640, 1650 and 1660 each have a sidewall and a barrier sufficiently tall to hold an edge portion of the carrier structure 1500. Accordingly, each slider clip 1640, 1650 and 1660 will have a clip frame with a taller sidewall than sidewalls 503 and 803 and a clip insert with a taller barrier than barriers 613 and 913. Each slider clip 1640, 1650 and 1660 optionally has a clip insert with a respectively longer C-shaped holding element so as to compensate for the wider and heavier carrier structure 1500.

It should be understood that the process of installing the carrier structure 1500 on the preassembled support structure 1620 is similar to the process of installing the PV module 100 on the support structure 200. Given that the carrier structure 1500 is generally longer, wider and heavier than a frameless PV module, in this example embodiment and as shown in FIG. 16, the carrier structure 1500 is inserted into four adjacent pairs of slider clips. For example, the carrier structure 1500 would be inserted into the long ends of four mid slider clip assemblies 1650a-d before being inserted into the short end of four adjacent mid slider clip assemblies 1650e-h. The slider clips are mounted on the beams 1610 such that a slider clip frictionally holds the carrier structure 1500 at approximately the center of each solar panel as shown in FIG. 16. Even though the embodiment is described with a set of eight slider slips holding a carrier structure 1500 having a 4 by 2 array of solar panels, it should be appreciated that any number of slider clips can be used depending on the size and arrangement of the carrier structure.

Figure 17A:
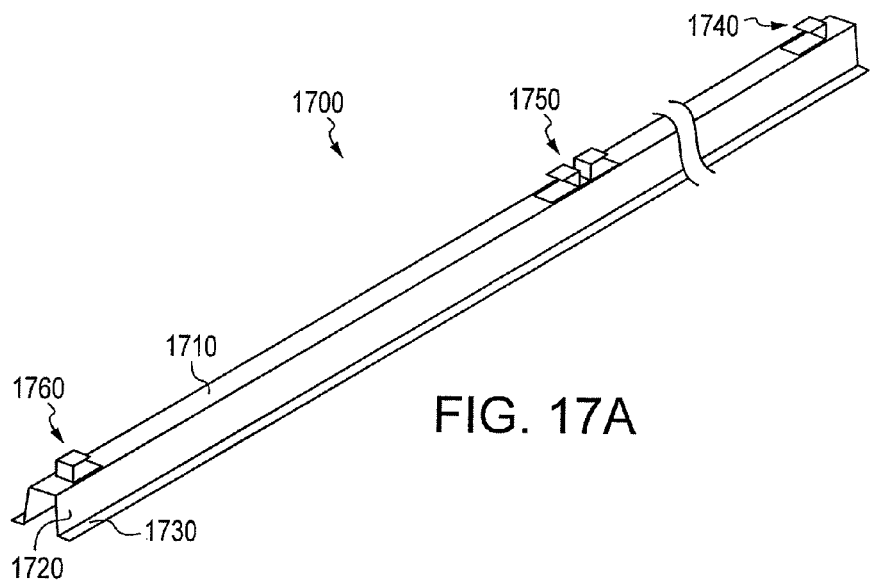
FIGS. 17A-C illustrate a module rail with an integrated slider clip in accordance with an embodiment described herein.
Figure 17B:
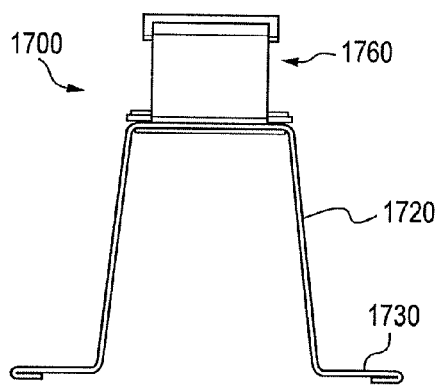
Figure 17C:
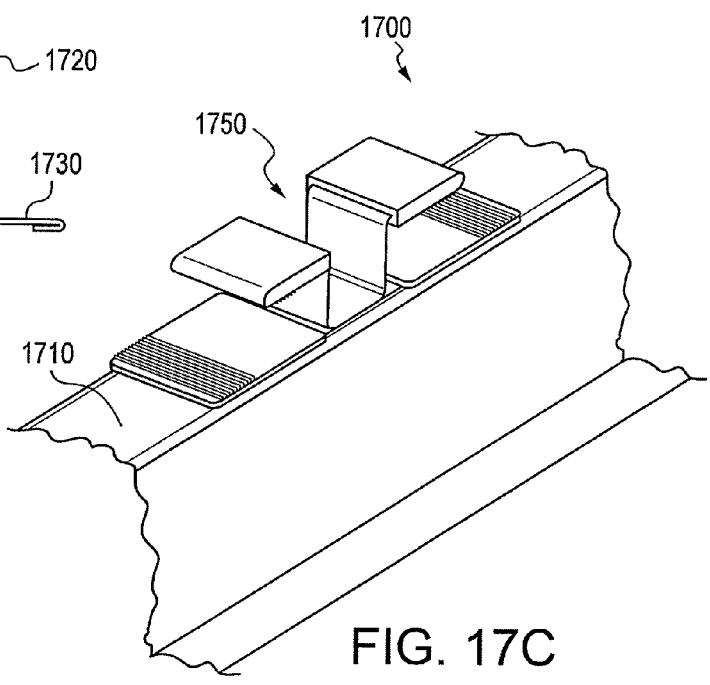

FIG. 17A illustrates a module rail 1700 with an integrated slider clip in accordance with another embodiment. Similar to rail 220, rail 1700 has a top plate 1710, side plates 1720 extending downward perpendicularly from the sides of top plate 1710 and base plates 1730 extending outward perpendicularly from the bottom of side plates 1720. Rail 1700 is also integrated with a top slider clip 1740, a mid slider clip 1750 and a bottom slider clip 1760. FIG. 17B illustrates an end view of rail 1700 at the cross section A-A'. It will be readily appreciated by those skilled in the art that slider clips 1740, 1750 and 1760 operate similarly to slider clip assemblies 240, 250 and 260, respectively. However, unlike slider clip assemblies 240, 250 and 260 which are fabricated separately from rail 220 and mounted to rail 220 using fasteners, slider clips 1740, 1750 and 1760 are formed integrally with rail 1700. Slider clips 1740, 1750 and 1760 can be manufactured using punch forming, press forming, or any other suitable metal forming technique. The clips can be formed into the material that forms the rail concurrent with or subsequent to forming the rail itself. A resilient material can optionally be added to the inside surfaces of the clips to engage with an edge portion of a PV structure. Optionally, a clip insert made of a resilient rubber, for example, EPDM rubber, can be attached to the inside surfaces of the clips as shown in FIG. 17C for the mid slider clip 1750 to hold the edge portion of a PV structure. It will be readily appreciated by those skilled in the art that rail 1700 can be used in a photovoltaic structure mounting system such as mounting system 300 by replacing rail 220 and clip assemblies 240, 250 and 260 with rail 1700. It should also be readily appreciated that the process of installing a PV module 100 on a mounting system using the clip integrated rail 1700 is similar to the installation process described in FIG. 13 in connection with the support structure 200. Furthermore, the process of installing a carrier structure 1500 on a mounting system using the clip integrated rail 1700 is similar to the installation process described above in connection with the support structure 1620.

Disclosed embodiments substantially reduce labor costs associated with the fabrication of PV mounting systems and reduce the time required for on-site mounting of PV modules. The slider clips used in the disclosed PV mounting systems can be fully tightened to a prefabricated module rail or other surface in a controlled environment and shipped to an installation site for installation of the PV modules. Large numbers of PV modules can be mounted quickly on the support structure using the disclosed slider clips.

While the invention has been described in detail in connection with embodiments known at the time, it should be readily understood that the claimed invention is not limited to the disclosed embodiments. Rather, the embodiments can be modified to incorporate any number of variations, alterations, substitutions, or equivalent arrangements not heretofore described. For example, while the disclosed embodiments of the slider clips are described in connection with module rails, beams, tilt tables and support columns, the embodiments can be mounted on other support surfaces or structures and other connecting means besides fasteners can be used to attach these embodiments to the support surfaces and structures. Furthermore, while the disclosed embodiments of the mounting system are described in connection with framed or frameless PV modules, the disclosed slider clips can be modified to support any dimension and type of PV structures including partially framed, foldable and flexible PV modules.

What is claimed as new and desired to be protected by Letters Patent of the United States is:

1. A clip for holding photovoltaic structure to a support structure, said clip comprising:
   a clip frame having a common support area, a first and second sidewall each connected, respectively, to the common support area, and a first and second top extension each connected, respectively, to the first and second sidewalls, the angle between the first and second sidewalls and the first and second top extensions being, respectively, less than 90 degrees;
   a pair of extending panel holding elements each abutting the first and second sidewalls, respectively, of the clip frame, and each extending in respective opposite directions from said common support area, one of said panel holding elements extending from said common support area to a greater extent than the other of said panel holding elements;
   a C-shaped panel holding area having a vertically extending wall, the C-shaped panel holding area extending in respective opposite directions from said common support area, the length of one of said C-shaped panel holding areas being greater than the length of the other of said C-shaped panel holding areas,
   wherein said clip has a bottom surface for mounting to said support structure and each of said panel holding elements has a side of said C-shaped panel holding area at said bottom of said clip and a side of said C-shaped holding area in contact with each respective top extension, each side of said C-shaped panel holding area at said bottom of said clip is longer than the opposing side of said C-shaped panel holding area in contact with each respective top extension of said clip.

2. The clip of claim 1, further comprising a resilient material provided on each C-shaped panel holding area for engaging with the photovoltaic structure.

3. The clip of claim 1, wherein said common support area includes mounting portions for mounting said clip frame to the support structure.

4. The clip of claim 3, wherein said mounting portions comprise at least one hole passing through said common support area for allowing a fastener to pass through the at least one hole.

5. The clip of claim 1, wherein the first and second top extensions each comprise at least one angled structure protruding from a top surface of each first and second top extensions for holding the panel holding elements in place with the clip frame.

6. The clip of claim 5, wherein the at least one angled structure is a tooth.

7. A clip for holding a photovoltaic structure to a support structure, said clip comprising:

a clip frame having a common support area, a first and second sidewall each connected, respectively, to the common support area, and a first and second top extension each connected, respectively, to the first and second sidewalls, the angle between the first and second sidewalls and the first and second top extensions being, respectively, less than 90 degrees; and a pair of extending panel holding elements each abutting the first and second sidewalls, respectively, of the clip frame, and each extending in respective opposite directions from said common support area, one of said panel holding elements extending from said common support area to a greater extent than the other of said panel holding elements, wherein the first and second top extensions each comprise at least one angled structure protruding from a top surface of each first and second top extensions for holding the panel holding elements in place with the clip frame, wherein each panel holding element comprises a curved element for engaging with the at least one angled structure protruding from the top extensions.

* * * * *